Oct. 31, 1944. J. DAUGHERTY 2,361,460
HYDRAULIC FEED AND TRAVERSE
Filed Oct. 29, 1942 2 Sheets-Sheet 1

INVENTOR.
JESSE DAUGHERTY.
BY
Allen + Allen
ATTORNEYS.

Oct. 31, 1944.  J. DAUGHERTY  2,361,460
HYDRAULIC FEED AND TRAVERSE
Filed Oct. 29, 1942  2 Sheets-Sheet 2
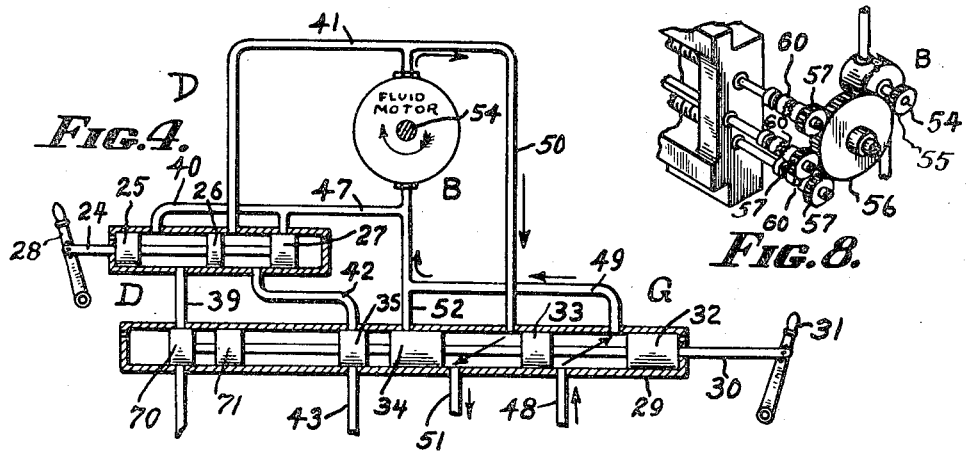
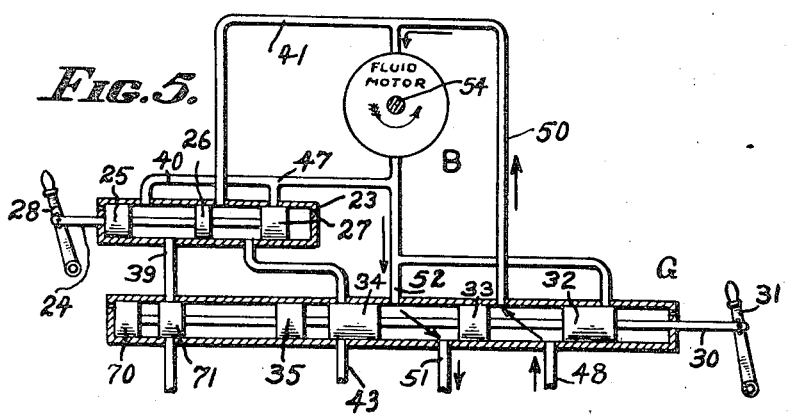
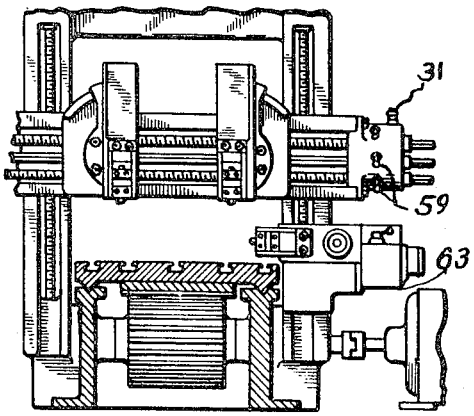
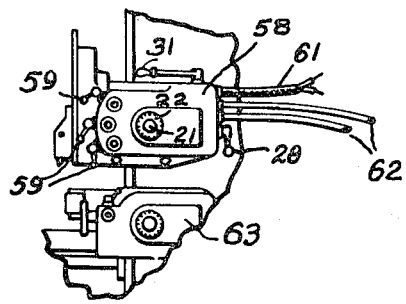
INVENTOR.
JESSE DAUGHERTY.
BY
ATTORNEYS.

Patented Oct. 31, 1944

2,361,460

UNITED STATES PATENT OFFICE 2,361,460

HYDRAULIC FEED AND TRAVERSE

Jesse Daugherty, Cincinnati, Ohio, assignor to The Cincinnati Planer Company, Cincinnati, Ohio, a corporation of Ohio Application October 29, 1942, Serial No. 463,835

2 Claims. (Cl. 90—49)

This application is a continuation application in part of my application Serial No. 262,945, filed March 20, 1939, for Hydraulic feed and traverse.

This invention relates to feed arrangements and particularly hydraulic feeds such, for example, as are particularly adaptable in connection with feeding the tool holding heads of a planer. While my invention is adaptable for use in connection with various types of machine tools, I will describe its use in connection with a planer without any intent to be limited to this specific application.

A metal planer consists of a table member, with arrangements to secure the work piece thereon, slidably mounted on a bed member which is provided with suitable mechanism to give a reciprocating motion of variable length of stroke to the table member.

One or more vertical members called "housing" or "columns" are fixed to the side of the bed, and a horizontal member or rail is mounted on the housings. One or more tool carrying members or heads are mounted on the rail, and others may be mounted on the housings. These heads are usually arranged to provide the cutting tool with horizontal, vertical, and other angular movements.

A work piece is placed on and secured to the table, and a cutting tool is fastened in one or more heads. The tool is then brought to close proximity to the work piece by engaging the proper head moving mechanism to suitable power means. This operation is called "traversing" the head. All this time the table, and consequently the work piece, has been standing still.

The reciprocating movement of the table is now started and the proper "feeding" motion imparted to the head and the cutting tool fastened therein. The word "feed" used in connection with a machine tool designates the function of advancing the tool a predetermined distance step by step into the path of the work, so that the tool will remove from the work material determined by the amount of interference of the cutting edge of the tool in the path of the moving work.

Machine tool feeds may be divided into two classes: continuous feeds for machines such as lathes, milling machines, boring mills, etc., and intermittent or step by step feeds for reciprocating tools such as shapers, planers, grinders, etc. It is the second class to which this device is appreciable; and the device combines the function of providing for the motion intermittently or step by step at a predetermined point in the machine cycle, in either direction, of a predetermined amount, and also a traverse motion, in either direction, for bringing the tool relatively great distances in reference to the work, all these being selectable through valving from a single power source, in the present case a fluid motor.

It is an object of my invention, therefore, to provide a hydraulic arrangement for providing feed and traversing means for the tool of a planer or other machine tool having similar feed and traversing requirements. It is another object of my invention to provide such an arrangement whereby the tool feed may be in either direction and the traverse may be in either direction, and whereby the feeding and traversing arrangements are mutually exclusive.

It is a further object of my invention to provide such an arrangement in which the amount of feed may be accurately adjusted. Still another object of my invention is to provide such an arrangement in which a single reservoir of oil or other fluid is provided, and in which a single pump and a single motor is utilized for the entire system.

These and other objects of my invention which will be described hereinafter or which will be apparent to one skilled in the art upon reading these specifications, I accomplish by that certain construction and arrangement of parts of which I shall now describe exemplary embodiments. Reference is now made to the drawings wherein:

Figure 4 is a partial schematic view of the motor reversing valve and traverse control, showing the traverse control in operation in one position.

Figure 5 is a view similar to Figure 4, showing the traverse control valve in the other position.

Figure 6 is a front elevation of a planer column showing the heads in position thereon.

Figure 7 is a partial side elevation as seen from the right in Figure 6.

Figure 8 is a partial perspective view showing how the movement of the motor of the system may be applied to the cross shafts of the planer.

Figures 1, 2, 3:
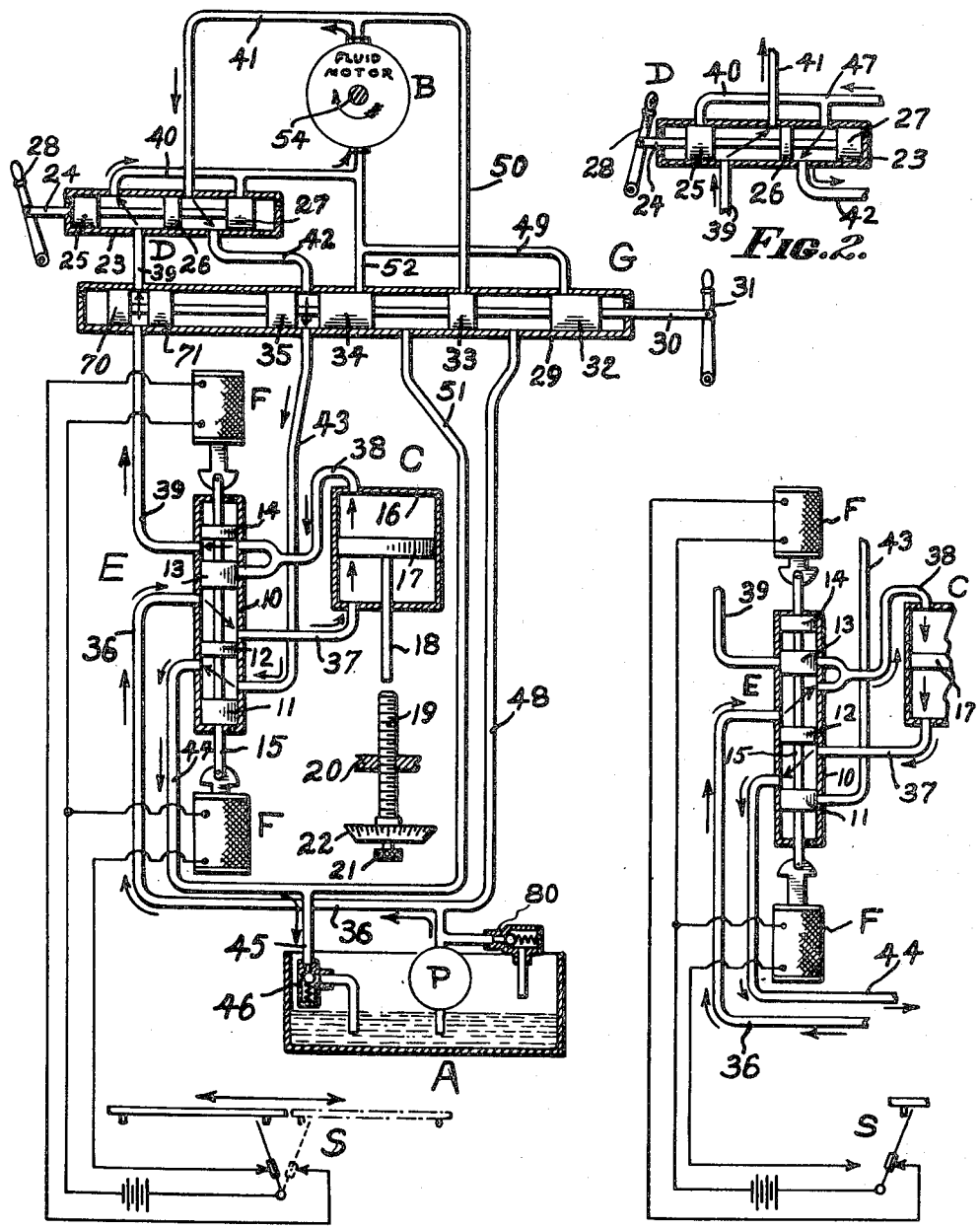
Figure 1 is a schematic diagram showing the fluid duct arrangement and the various valves in one feeding position.
Figure 2 is a partial schematic view of the valve of Figure 1 for reversing the feed, wherein the valve is in reversed position.
Figure 3 is a partial schematic view showing the solenoid actuated valve of Figure 1 at the end of its other stroke.

Briefly, in the practice of my invention I provide a reservoir indicated generally at A, and having a pump P with a pressure relief valve for supplying the fluid from the reservoir to the system. The system includes a fluid motor B, preferably of the positive or piston type, and adapted to be driven for a certain predetermined amount of movement by means of the cylinder and piston generally shown at C, through a reversing valve D. The piston is actuated within its cylinder through a valve E operated by solenoids F at the ends of the stroke of the planer table. A valve G is provided for cutting off the tool feed circuit and for permitting actuation of the motor B direct from the pump P for traversing of the tool.

In other words, for the feeding actuation of the tool the pump P forces liquid through valve E into one end of cylinder C. The fluid in the other end of cylinder C is then forced again through valve E and valves G and D to actuate the fluid motor an amount of movement as determined by the volume above the piston in cylinder C. The valve E is for the purpose of returning the piston in cylinder C to its starting position. The valve D is a reversing valve for reversing the direction of the motor B when feeding the tool. It will be obvious that the valve D could be eliminated and other reversing mechanism used in connection with the motor B. In the traversing movement the pump P, through valve G, actuates the motor B directly either in one direction or the other, determined by the position of the valve G. When this traversing motion is being imparted to the motor B, the meter piston C and its controlling valve is cut out of the system.

The valve E which actuates and is related to the metering piston C, is shown in Figure 1, and comprises a cylinder 10 and a piston rod 15 therein carrying four pistons indicated respectively at 11, 12, 13 and 14. The piston rod 15 on which the pistons are mounted, is moved in one direction or the other by means of the solenoids F which are appropriately connected to a switch generally indicated at S and adapted to be actuated by a dog on the planer table. The reciprocating movement of the planer table is accomplished by means known to the art and with which this invention is not concerned. It will be clear that in the position shown in Figure 1, where the table has just finished its stroke to the left, a circuit will be established to the lower solenoid F, whereby the piston rod 15 will be pulled downwardly as shown in the drawings in Figure 1. When the planer table moves to the right, throwing the switch S to its other position, the upper solenoid F will be energized and the valve E will assume the position shown in Figure 3.

The metering piston and cylinder arrangement generally indicated at C in Figure 1 includes the cylinder 16, piston 17, and piston rod 18. A threaded stop member 19 having engagement in a threaded opening in the housing, a portion of which is indicated at 20, is provided with an adjusting knob 21 and scale 22, by which the amount of projection of the member 19 in reference to the housing 20 may be predetermined, and thus the stroke of the piston 17 predetermined. It is the upward stroke of the piston 17, as shown in Figure 1, which supplies fluid to the motor B to actuate the feed, and it will thus be clear that the feed will be determined by the stroke of this piston as set by means of the adjusting knob 21.

The motor B may be of any well known type of fluid motor. However, I prefer a positive or piston type of rotary fluid motor. The pump P may be of any well known type, either with a relief valve built in it to prevent stalling, or with a separate relief valve in connection therewith as indicated at 80 in Figure 1 of the drawings.

The reversing valve D comprises a cylinder 23 and a piston rod 24 therein carrying pistons 25, 26 and 27. The piston rod 24 is provided with a control handle 28. This device is simply a reversing valve to cause the fluid being supplied from the cylinder C to be supplied to the motor B from one side or the other, so as to drive the motor B in different directions, as is apparent from Figures 1 and 2.

The valve G is the traverse valve for controlling relatively great movement of the cutting tool, and comprises a cylinder 29, a piston rod 30 therein connected to a control handle 31, and carrying six pistons at 32, 33, 34, 35, 70 and 71 respectively. The valves D, E, and G are of course appropriately ported and vented as shown, and may be of a design somewhat different from that shown, since the drawings are schematic and are for the purpose of illustrating the porting and actuation of the valves.

I will now describe the operation of the device in feeding a cutting tool when all the parts are in the position shown in Figure 1.

The pump P takes oil or other fluid from the reservoir A and supplies it through the duct 36 to the valve E. The fluid passes through the valve E as shown by the arrow into the duct 37 to the rod end of the cylinder C and under the piston 17, forcing it upwardly. The fluid above the piston 17 and in the head end of the cylinder C passes through the duct 38 and back through the valve E, as shown by the arrow, and into the duct 39, from whence it passes through the valves G and D, as shown by the arrow, to the duct 40. The valve G, which is the traversing valve, is in its neutral position, and in this position while preventing fluid directly from the pump actuating the motor B, permits the fluid from above the piston 17 to pass through it and on through the valve D and to the duct 40 which directly communicates with one side of the motor B and drives the same in a given direction. The exhaust fluid from the motor B flows through the duct 41 back through the valve D in the direction of the arrow to the duct 42. From the duct 42 the fluid again passes through the traverse control valve G as shown by the arrow, into the duct 43, and thence back through the valve E, as shown by the arrow, to the duct 44, whence through the duct 45 and the ball valve 46 it returns to the reservoir A. The ball valve 46 is to prevent return of oil to the reservoir except under pressure, and thus prevents drainage of the system. It will be understood that the result of the course of events described above is to cause the motor B to operate in one direction for a relatively short length of time. The amount of movement of the motor B, and hence the amount of feeding of the cutting tool, is determined by the position of the adjusting screw 19 which limits the stroke of the piston 17, settings being indicated by the dial 22. The amount of movement of the piston 17 therefore determines the distance the tool is advanced into the work path.

As the planer table reaches the opposite end of its stroke it actuates the switch S in the other direction, which in turn energizes the upper solenoid F, whereby the valve E is thrown into the position shown in Figure 3. When this happens the fluid being supplied to the valve E through the duct 36, passes therethrough in the direction of the arrow, and through the duct 38 enters the cylinder C at the upper end above the piston 17 and forces the piston 17 downwardly until the rod 18 abuts the stop screw 19. Fluid in the lower portion of the cylinder C below the piston 17 is returned through the duct 37 through the valve E in the direction of the arrow, and into the return ducts 44 and 45, and returns to the reservoir A as described above. The relief valve 80 on the pump P relieves the pressure on the pump and prevents the stalling of the same after the piston 17 has been forced downwardly. It will be understood that the above operation described produces no feeding motion whatever, but simply resets the piston 17 for the next tool feeding operation.

Valve D is merely a reversing valve to reverse the direction of turn of the motor B for tool feeding. Referring to Figure 2, it will be understood that if the valve D is thrown into the reverse position shown there, the fluid passing through the duct 39 follows the arrows into the duct 41, thereby passing through the motor B in a reverse direction, and is returned through the duct 47 from which it passes through the valve D as shown by the arrow, into the duct 42 from which it is returned to the reservoir A as described above in connection with the description of Figure 1. In connection with Figure 2, it should be noted that when the valve is in the position shown, the piston 25 blocks return of oil to the duct 39, while in the position of Figure 1 the piston 27 prevents oil from being returned to the reservoir, before it passes to the motor. The piston 26 determines the connection of the duct 41 with either of the ducts 39 or 42.

In connection with the valve E, it should be noted that in the position of Figure 1 the piston 13 insures the passage of oil from the duct 38 to the duct 39, while the piston 12 insures passage of oil from the duct 36 to the duct 37, and piston 11 permits passage of oil from the duct 43 to duct 44. As shown in Figure 3, the piston 13 permits connection of the ducts 36 and 38, and the piston 12 permits connection of the ducts 37 and 44, while the piston 11 blocks return through the duct 43.

I will now describe the traversing setting of the valves and the manner in which it operates.

Valve G is the traversing valve which in effect cuts off the metering system for the feed movement and directly connects the fluid from the pump P to the motor B. This valve in Figure 1 is shown in neutral position so that feed can take place as described above, and it will be noted that pistons 70 and 71 do not block the duct 39 while pistons 32, 33, and 34 block all the ducts leading to the motor B. When the traverse control handle 31 is moved to the right as shown in Figure 4, it will be noted that piston 70 completely blocks off the feeding duct 39, and that piston 35 blocks the ducts 42 and 43 leading from the feed control valve, thereby preventing any feeding action. In the position shown in Figure 4, the fluid pumped by the pump P passes through the duct 48 through the valve G in the direction of the arrow, and thence through the duct 49 to the motor B. From the motor B the fluid returns through the duct 50 and through the valve G, as shown by the arrow, into the return duct 51 which connects with the duct 45 returning the fluid to the reservoir A.

Referring to Figure 5, when the traverse control lever 31 is thrown to the left the fluid in entering the valve G through the duct 48 passes therethrough in the direction of the arrow into the duct 50, thence to the motor B in a reverse direction, and returns through the duct 52 to the valve G, through which it passes in the direction of the arrow to the return duct 51.

It will be noted that the pistons 70 and 71 together with pistons 34 and 35 leave ducts 39 and 43—42 open when the traverse valve G is in neutral position. However, when the valve G is in either the position of Figure 4 or Figure 5, the pistons 70 and 71 and 35 and 34, respectively, block the ducts 39 and 43—42, thus sealing off the feeding control and mechanism.

As shown in Figure 8, the oil motor may be contained within a casing and the oil motor shaft 54 may be provided with a gear 55 engaging with a gear 56, the latter gear driving a number of pinions 57 which may be connected to the two heads and slides, respectively, for horizontal movement of the heads or vertical movement of the slides in either direction. Figures 6 and 7 merely show how my device may be embodied in a planer of conventional design. As shown in Figure 7, the entire mechanism, with the exception of the oil motor and the reservoir and pump, may be contained in a single casting indicated generally at 58. 28 indicates the feed reverse handle, and 31 again indicates the traversing control handle. The levers 59 may control respectively the clutches 60, shown in Figure 8. The dial 22 and the control knob 21 may appear as shown. Thus the entire unit may be made up from a single casting with appropriate drilled ducts and the unit will thus occupy a very small space. An electric cable is indicated at 61 which contains the wires leading to the switch S from the solenoids F, and flexible oil ducts are indicated at 62.

It will be understood, of course, that the invention may be applied to one or more side heads such as the head indicated generally at 63.

While I have shown and described a feeding and traversing means wherein both the feed and traverse of the tool actuating motor may be reversed, it is of course possible in my invention to eliminate the hydraulic reversing mechanism as indicated by valve D and one position of valve G, and substitute in their place mechanical reversing means, if this should be found desirable.

It will be seen that I have provided a simple and compact feed and traverse unit which may be of use in various types of machine tools, although I have described it particularly with a planer. It will be understood that I do not intend to be limited in the application of this invention to any type of machine tool to which it may be appropriate, and that I do not intend to restrict myself to any particular kind of fluid for use in the system, and any particular kind of pump or fluid motor, and it will also be clear that various modifications may be made in the design of the various valves without departing from the spirit of my invention.

Having now fully described my invention, what I claim as new and desire to secure by Letters Patent is:

1. In combination with a planer, a hydraulic system for imparting feed and traverse motion to a tool holder, including a fluid reservoir, a fluid pump, a rotary fluid motor, and a metering cylinder, a valve in connection with said metering cylinder, means to shift said valve alternately from one position to a second position at each end of the travel of the planer table, said valve in one position providing a connection through said fluid pump between said reservoir and one side of the piston of the metering cylinder to move said piston to starting position and to permit exhaust from the other side of said piston to said reservoir, said valve in the second position providing a connection through said fluid pump between said reservoir and the other side of said piston, and a connection between the first side of said piston and said rotary fluid motor, whereby a metered amount of fluid will be supplied to said rotary fluid motor in order to operate it a predetermined number of turns or portions of a turn.

2. In combination with a planer, a hydraulic system for imparting feed and traverse motion to a tool holder, including a fluid reservoir, a fluid pump, a rotary fluid motor, and a metering cylinder, a valve in connection with said metering cylinder, means to shift said valve alternately from one position to a second position at each end of the travel of the planer table, said valve in one position providing a connection through said fluid pump between said reservoir and one side of the piston of the metering cylinder to move said piston to starting position and to permit exhaust from the other side of said piston to said reservoir, said valve in the second position providing a connection through said fluid pump between said reservoir and the other side of said piston, and a connection between the first side of said piston and said rotary fluid motor, whereby a metered amount of fluid will be supplied to said rotary fluid motor in order to operate it a predetermined number of turns or portions of a turn, reversing means in the connection between the first side of said piston and said rotary fluid motor, a direct supply connection between said reservoir through said fluid pump and said rotary fluid motor, and reversing means in said direct supply, said means being arranged in a neutral position to block the circuit between said metering piston and said rotary fluid motor.

JESSE DAUGHERTY.